United States Patent
Mani et al.

(10) Patent No.: US 10,237,079 B2
(45) Date of Patent: Mar. 19, 2019

(54) INTELLIGENT NETWORK SLEEP PROXY FOR LOW POWER SLEEPING DEVICES

(71) Applicant: Cisco Technology, Inc., San Jose, CA (US)

(72) Inventors: Selvaraj Mani, Milpitas, CA (US); Swapna Yelamanchi, Fremont, CA (US); Amarender Musku, Santa Clara, CA (US); Rakesh Reddy Kandula, Bengaluru (IN); Deep Preet Singh, San Jose, CA (US); Shwetha Subray Bhandari, Bangalore (IN); Shrirang Arvind Bage, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 15/479,738

(22) Filed: Apr. 5, 2017

(65) Prior Publication Data

US 2018/0294983 A1    Oct. 11, 2018

(51) Int. Cl.
*H04L 12/12* (2006.01)
*H04L 29/08* (2006.01)
*H04L 29/12* (2006.01)

(52) U.S. Cl.
CPC .......... *H04L 12/12* (2013.01); *H04L 61/1511* (2013.01); *H04L 67/28* (2013.01); *H04L 67/2814* (2013.01)

(58) Field of Classification Search
CPC ..... H04L 12/12; H04L 61/1511; H04L 67/28; H04L 67/2814; H04L 29/08846
See application file for complete search history.

(56) References Cited

U.S. PATENT DOCUMENTS

| 8,626,893 | B2 | 1/2014 | Lu et al. | |
|---|---|---|---|---|
| 9,197,600 | B2 | 11/2015 | L'Heureux et al. | |
| 9,226,139 | B2 | 12/2015 | O'Neill | |
| 9,311,269 | B2 | 4/2016 | Davis et al. | |
| 2007/0078959 | A1* | 4/2007 | Ye | H04L 67/16 709/223 |
| 2009/0225688 | A1* | 9/2009 | O'Neill | H04L 63/08 370/310 |

(Continued)

FOREIGN PATENT DOCUMENTS

WO    WO-2013123445 A1    8/2013

OTHER PUBLICATIONS

Cheshire et al. "Multicast DNS" Internet Engineering Task Force (IETF); Request for Comments: 6762; Category: Standards Track; ISSN: 2070-1721; Apple Inc.; Feb. 2013; pp. 1-70.

(Continued)

*Primary Examiner* — Benjamin H Elliott, IV
(74) *Attorney, Agent, or Firm* — Behmke Innovation Group LLC; James Behmke; Stephen D. LeBarron (57) ABSTRACT

In one embodiment, a sleep proxy device identifies one or more services offered by a first node in the network. The sleep proxy device announces the one or more identified services to a second node in the network on behalf of the first node. The sleep proxy device intercepts an attempt by the second node to use the one or more services offered by the first node. The sleep proxy device causes the first node to switch from a low power state to an awake state, based on the intercepted attempt.

18 Claims, 10 Drawing Sheets

(56) References Cited

U.S. PATENT DOCUMENTS

| | | | |
|---|---|---|---|
| 2010/0202357 A1* | 8/2010 | Kim | H04L 63/0892 370/328 |
| 2010/0235668 A1* | 9/2010 | Cheshire | G06F 1/3209 713/323 |
| 2017/0171232 A1* | 6/2017 | Graham-Cumming | H04L 63/1416 |
| 2018/0077624 A1* | 3/2018 | Jung | H04W 36/03 |
| 2018/0294983 A1* | 10/2018 | Mani | H04L 12/12 |

OTHER PUBLICATIONS

Bonjour (software); Wikipedia; https://en.wikipedia.org/wiki/Bonjour_(software); pp. 1-5, Published Feb. 9, 2017.

\* cited by examiner

FIG. 7

INTELLIGENT NETWORK SLEEP PROXY FOR LOW POWER SLEEPING DEVICES

TECHNICAL FIELD

The present disclosure relates generally to computer networks, and, more particularly, to an intelligent network sleep proxy for low power sleeping devices.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

With respect to the services offered by a given network node, mechanisms such as Bonjour allow the node to advertise its services to the other nodes in the network. For example, a printer in the network may use Bonjour to notify the other nodes in the network of its existence and its printing services. However, these types of mechanisms are often unusable by many LLN devices which lack the necessary resources to participate in the mechanism.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a sleep proxy device identifies one or more services offered by a first node in the network. The sleep proxy device announces the one or more identified services to a second node in the network on behalf of the first node. The sleep proxy device intercepts an attempt by the second node to use the one or more services offered by the first node. The sleep proxy device causes the first node to switch from a low power state to an awake state, based on the intercepted attempt.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
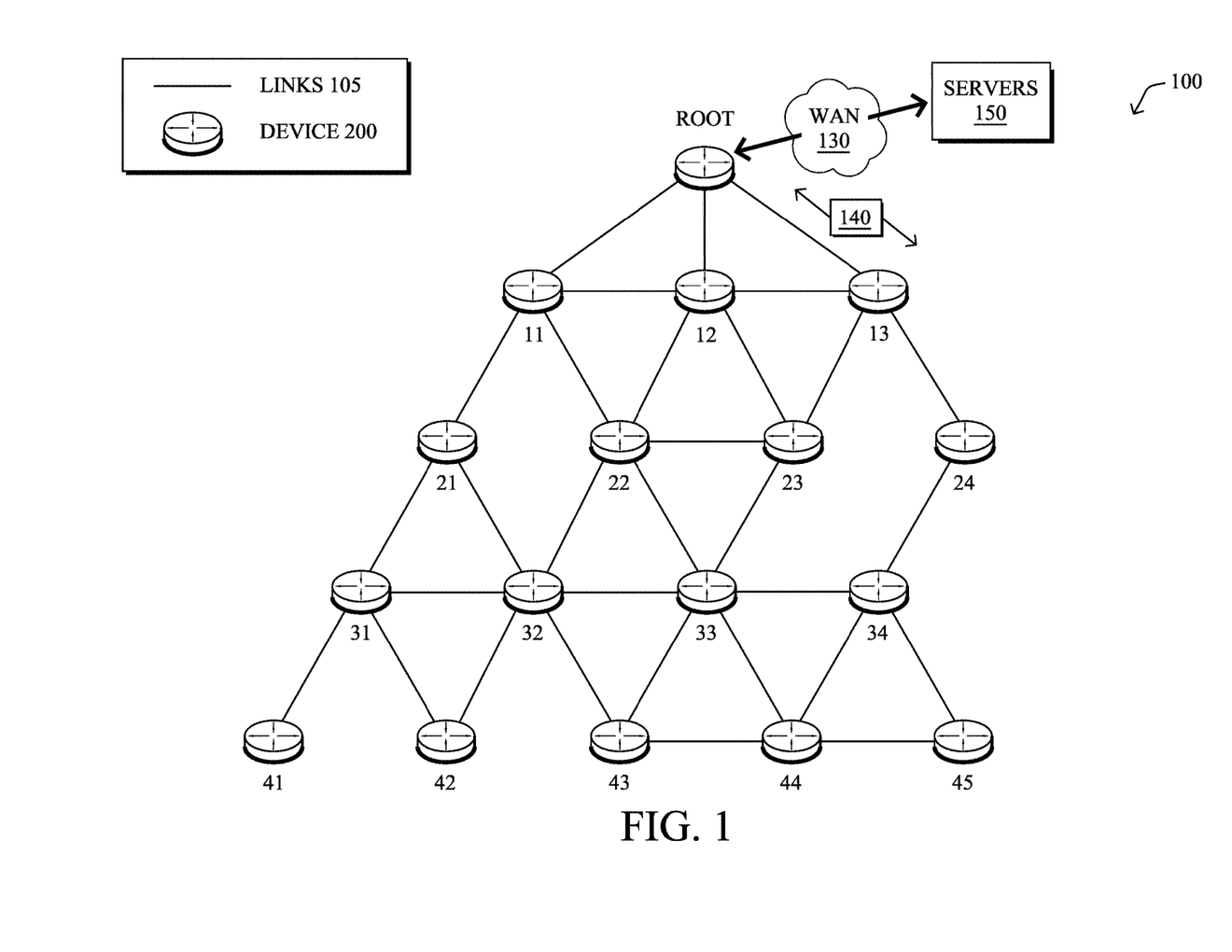
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
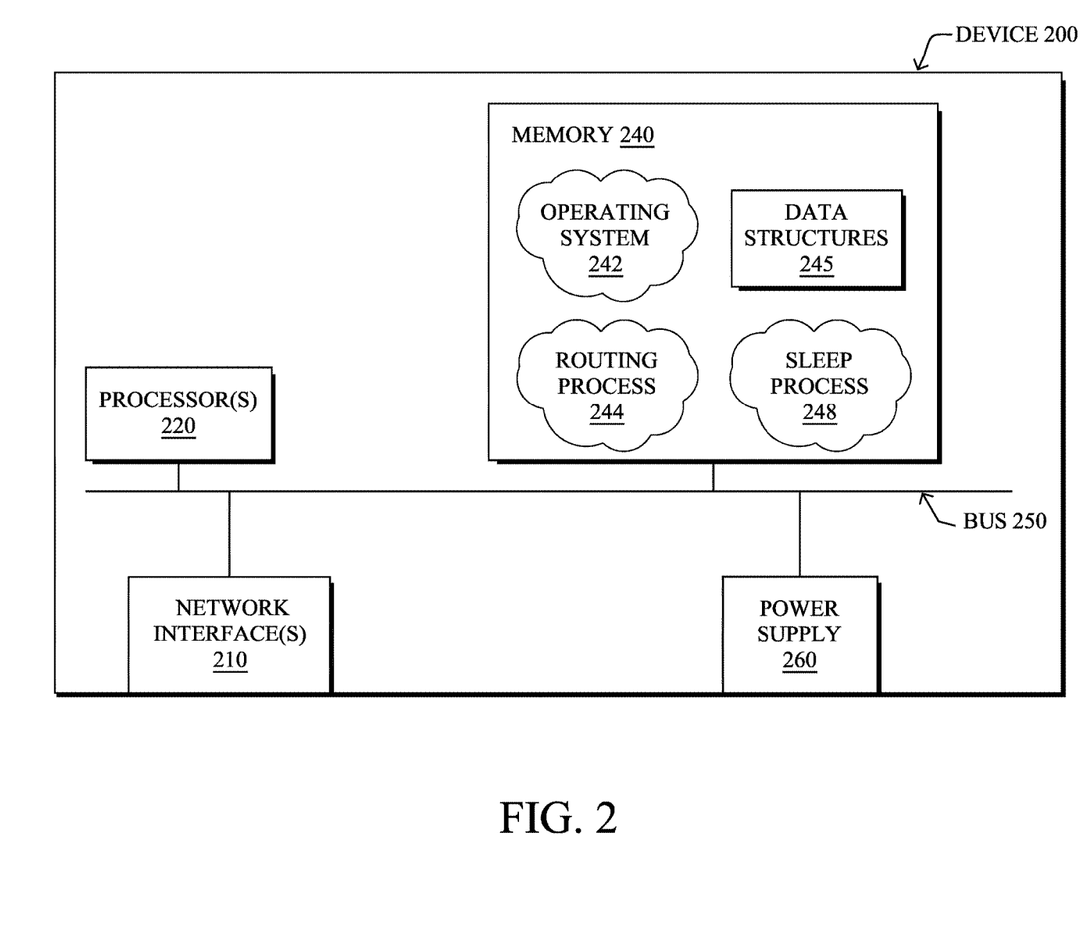
FIG. 2 illustrates an example network device/node.

FIG. 2 is a schematic block diagram of an example node/device 200 that may be used with one or more embodiments described herein, e.g., as any of the nodes shown in FIG. 1 above, or any of the other nodes/devices described herein. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.). In some cases, power supply 260 may supply power from a primary power source (e.g., a power line) or, in case of failure of the primary power source, from a secondary power source (e.g., a battery, an ultra-capacitor, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative sleep process 248, which may be configured depending upon the particular node/device within the network 100 with functionality ranging from intelligent learning machine processes to merely communicating with intelligent learning machines, as described herein. Note also that while the sleep process 248 is shown in centralized memory 240, alternative embodiments provide for the process to be specifically operated within the network interfaces 210 (e.g., "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN)

and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
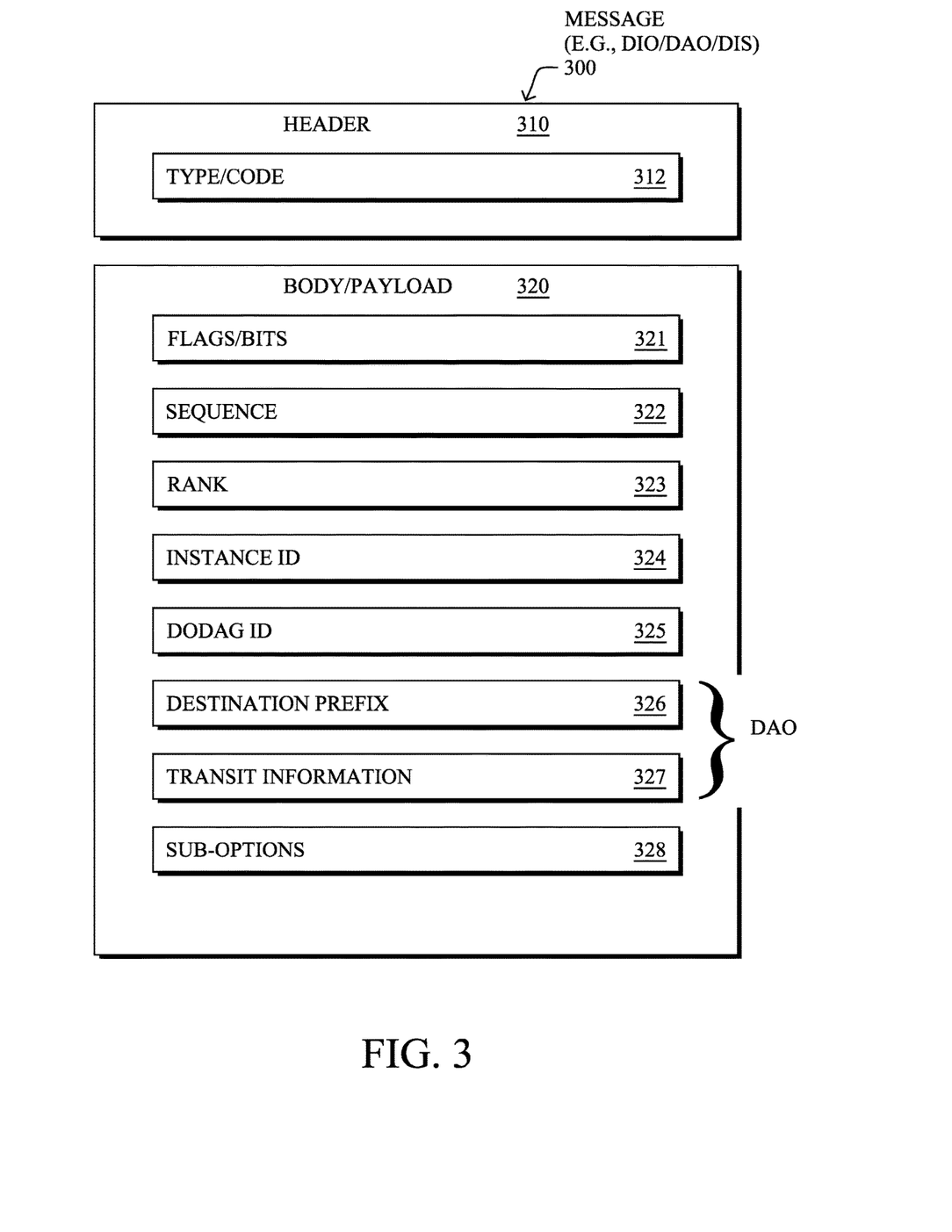
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
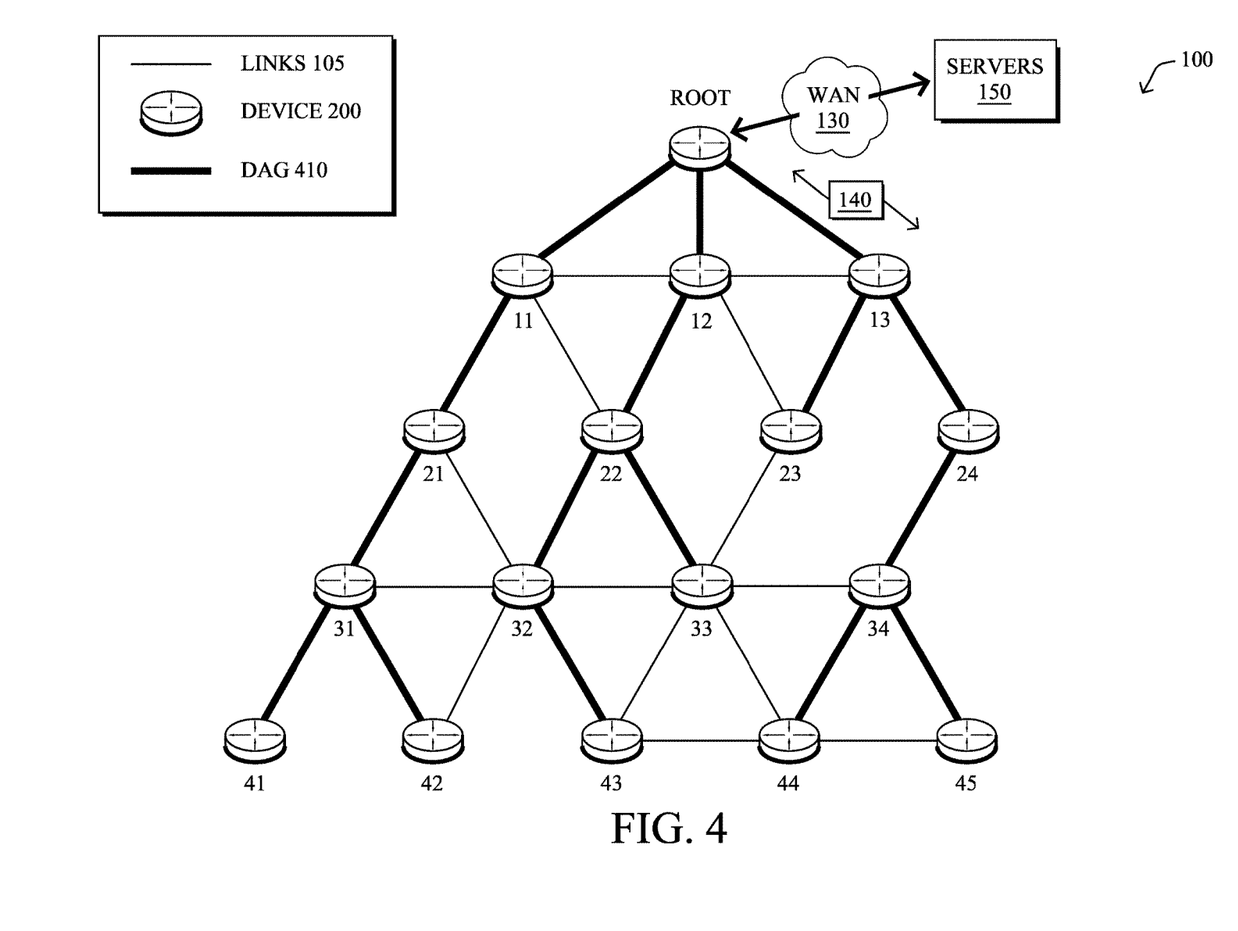
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, many LLN nodes/devices have resource constraints, such as energy constraints (e.g., a battery-powered sensor or actuator, etc.). To conserve energy consumption, some LLN nodes are configured to switch to a low power state (e.g., a "sleep" mode) when not in use and revert to an awake state as needed. For example, if a sensor only sends a measurement reading every hour, the device may switch to its sleep state in between sending readings via the network (e.g., by powering down its transceiver, etc.).

Wake on Demand (WoD) presents one way in which sleeping nodes can be woken up on request by a sleep proxy. For example, a client may explicitly request a sensor reading from a sensor outside of its normal reporting timeframe and, in turn, the sleep proxy may wake up the sensor. However, many traditional WoD mechanisms are also not applicable to LLN devices, due to their constrained resources. Notably, existing WoD mechanisms, such as Bonjour by Apple, Inc., require the endpoint node to execute a Domain Name System (DNS) client, multicast DNS (mDNS) client, and/or IP stack, to advertise its services the other networks. For example, the endpoint node in Bonjour is required to register its services with the sleep proxy using unicast DNS. By their very nature, however, many LLN devices are incapable of satisfying these requirements.

Intelligent Network Sleep Proxy for Low Power Sleeping Devices

The techniques herein provide an intelligent, network-based sleep proxy that is able to act on behalf of an endpoint node to support heterogeneous types of services. In some aspects, such as in the case of LLN nodes or other constrained devices, the sleep proxy device may identify and advertise the offered services of a given node to other nodes in the network and wake the given node from a low power state, as needed.

Specifically, according to one or more embodiments of the disclosure as described in detail below, a sleep proxy device identifies one or more services offered by a first node in the network. The sleep proxy device announces the one or more identified services to a second node in the network on behalf of the first node. The sleep proxy device intercepts an attempt by the second node to use the one or more services offered by the first node. The sleep proxy device causes the first node to switch from a low power state to an awake state, based on the intercepted attempt.

Illustratively, the techniques described herein may be performed by hardware, software, and/or firmware, such as in accordance with the sleep process 248, which may include computer executable instructions executed by the processor 220 (or independent processor of interfaces 210) to perform functions relating to the techniques described herein, e.g., in conjunction with routing process 244.

Operationally, FIGS. 5A-5E illustrate examples of an intelligent sleep proxy operating in a network, according to various embodiments. As shown, assume that network 500 includes a first node 502 that provides one or more services within network 500. For example, first node 502 may be a sensor that provides a measurement reporting service, an actuator that actuates a mechanical or electronic device, or the like. Connected to first node 502 via network 500 may also be a second node 504 that can act as a client with respect to the service(s) of first node 502. For example, if first node 502 is a sensor, second node 504 may be a node/device that can receive and process the measurements from the sensor (e.g., by aggregating measurements, using the measurements for control purposes, etc.), sent to node 502 via network traffic 510.

Figure 5A:
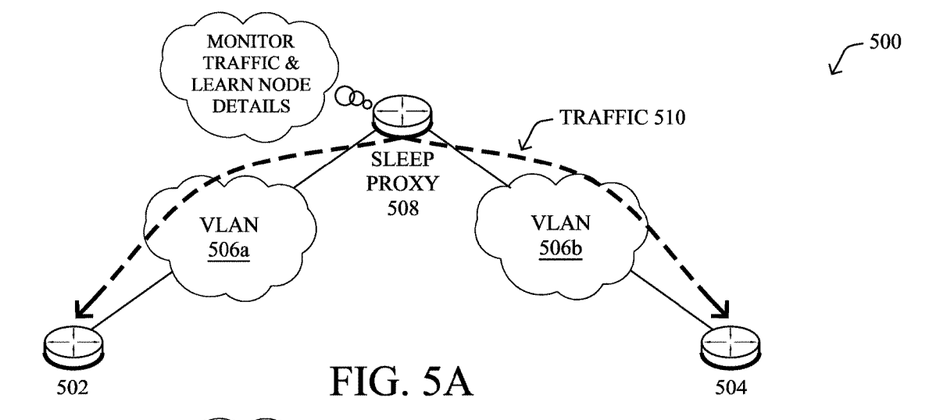
FIGS. 5A-5F illustrate examples of an intelligent sleep proxy operating in a network.

Network 500 may also include a sleep proxy device 508. Generally, sleep proxy device 508 may be of any number of different types of networking devices. For example, sleep proxy device 508 may be a router, switch, or server located within network 500 that is configured to act as a sleep proxy. As shown, first node 502 may be connected to sleep proxy device 508 via a first virtual LAN (VLAN) 506*a*. Similarly, second node 504 may be connected to sleep proxy device 508 via a second VLAN 506*b*. For example, VLANs 506*a*, 506*b* and their associated nodes 502-504, may be located on different floors of the same building. As would be appreciated, the configuration of network 500 is illustrative only and the techniques herein can be applied to any number of different network configurations.

In various embodiments, sleep proxy device 508 may be configured to act on behalf of first node 502 in terms of advertising the available service(s) of node 502 to the other nodes in network 500. Notably, if first node 502 is an LLN device with limited capabilities and resources (e.g., limited power resources, MAC only communications, etc.), this allows a service advertisement mechanism to still be used advertise the service(s) of node 502 in network 500 and simply leaving node 504 to do its intended job. Thus, first node 502 may not even need to execute a DNS client, mDNS client, and/or IP stack, yet still be included in the service advertisement mechanism.

To discern the one or more services offered by first node 502, sleep proxy device 508 may monitor traffic 510 associated with node 504 and learn the details of the services offered by first node 502, in some embodiments. In particular, sleep proxy device 508 may assess the port(s) used by node 504, the device type of node 504, and/or the contents of traffic 510, to identify the service(s) offered by node 504. For example, if sleep proxy device 508 determines that the packets of traffic 510 include temperature readings, that the device type of node 504 is a temperature sensor, etc., sleep proxy device 508 may determine that node 504 offers a temperature sensing service within network 500. As would be appreciated, this avoids node 504 having to maintain and advertise information regarding its offered services.

Figure 5B:
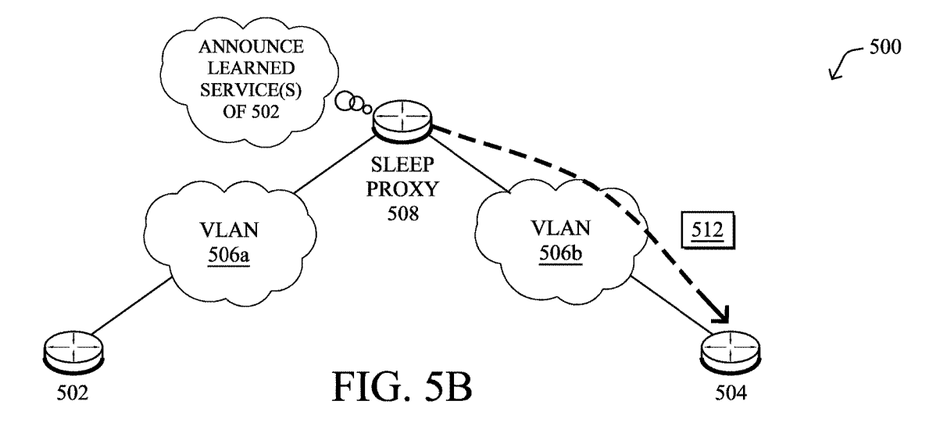

As shown in FIG. 5B, sleep proxy device 508 may announce the learned service(s) offered by first node 502 to the other nodes within network 500. For example, sleep proxy device 508 may send a notification 512 to second node 504 indicative of the service(s) offered by node 502, either on a pull or push basis. Notification 512 may be, e.g., an mDNS message indicative of the service(s) offered by node 502, or via another such protocol.

Figure 5C:
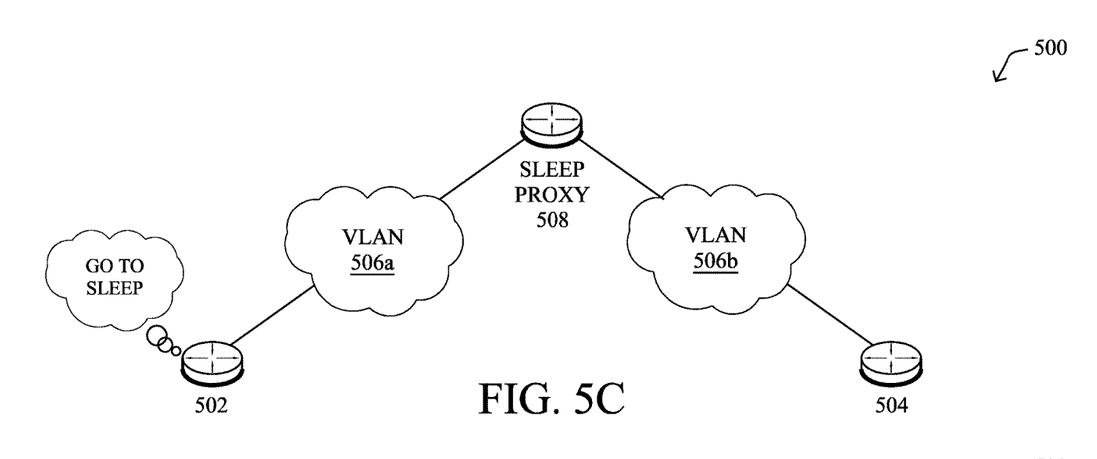

In FIG. 5C, assume now that first node 502 enters into its sleep/low-power mode. In such a mode, node 502 may turn off some or all of its components, thereby reducing its power consumption. For example, first node 502 may turn off its transmitter, stop taking sensor readings, etc., while in this mode. Node 502 may then remain in its low power mode until the expiration of a timer has occurred and/or until it receives a WoD message from sleep proxy device 508.

Figure 5D:
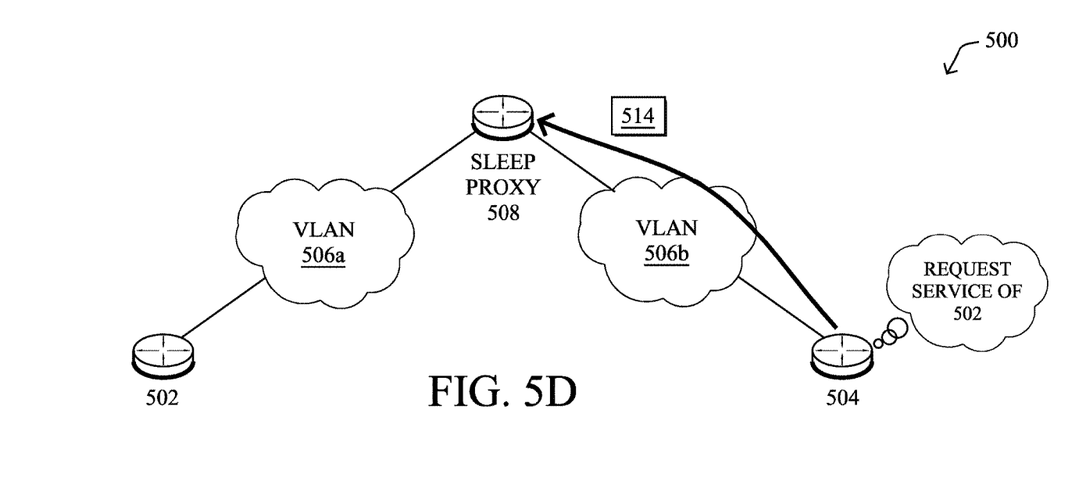
Figure 5E:
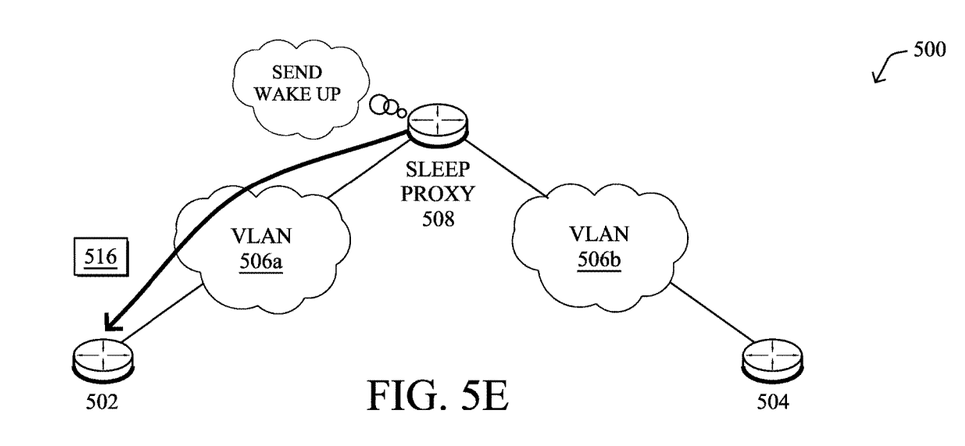
Figure 5F:
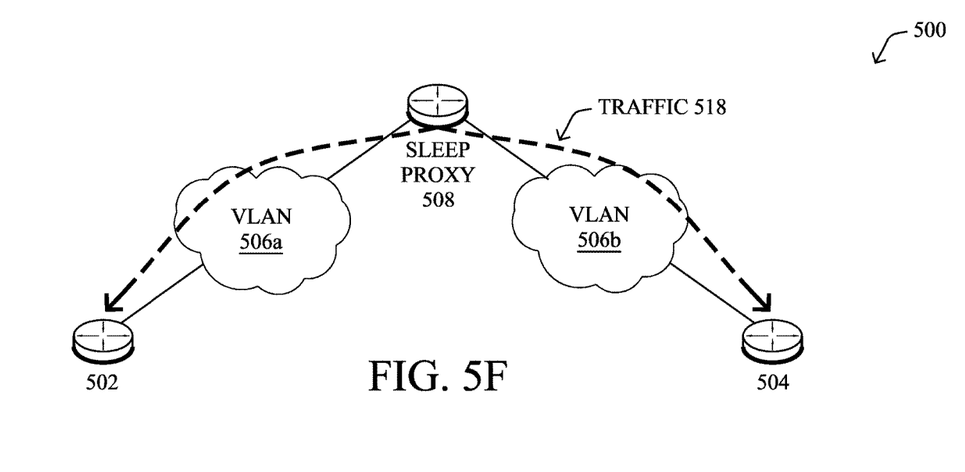

In FIG. 5D, assume now that second node 504 requests a particular service of node 502 via a request 514. For example, based on the offered services advertised by sleep proxy device 508, second node 504 may subsequently request use of one of the services offered by node 502. However, at this point in time, node 502 may still be in its low power mode. In such cases, as shown in FIG. 5E, sleep proxy device 508 may cause node 502 to wake up from its low power state, so that node 502 can communicate with node 504. For example, sleep proxy device 508 may send a WoD packet to node 502, thereby causing node 502 to awaken for communication to node 504 that has requested its service(s).

Figure 6A:
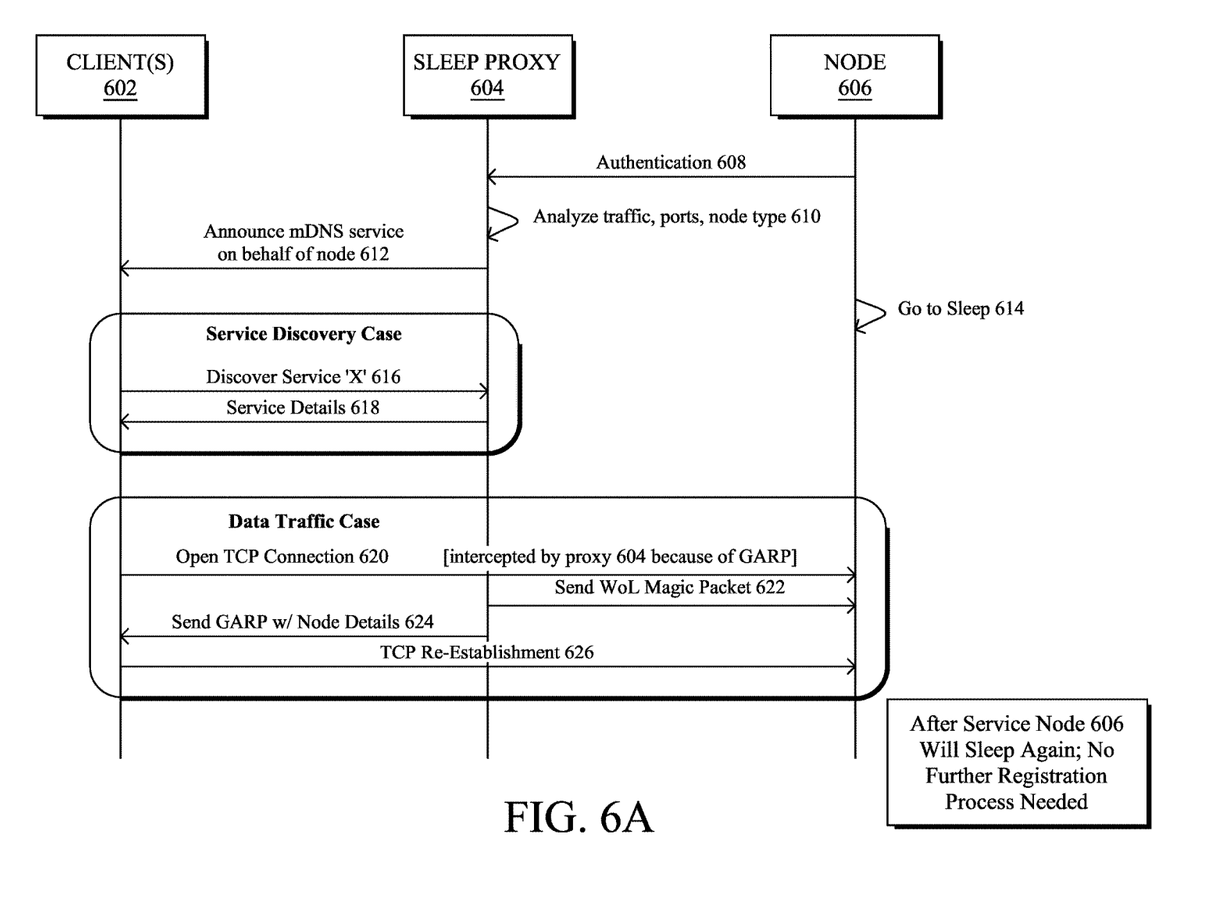
FIGS. 6A-6B illustrate example sequence diagrams of a sleep proxy using the techniques herein.
Figure 6B:
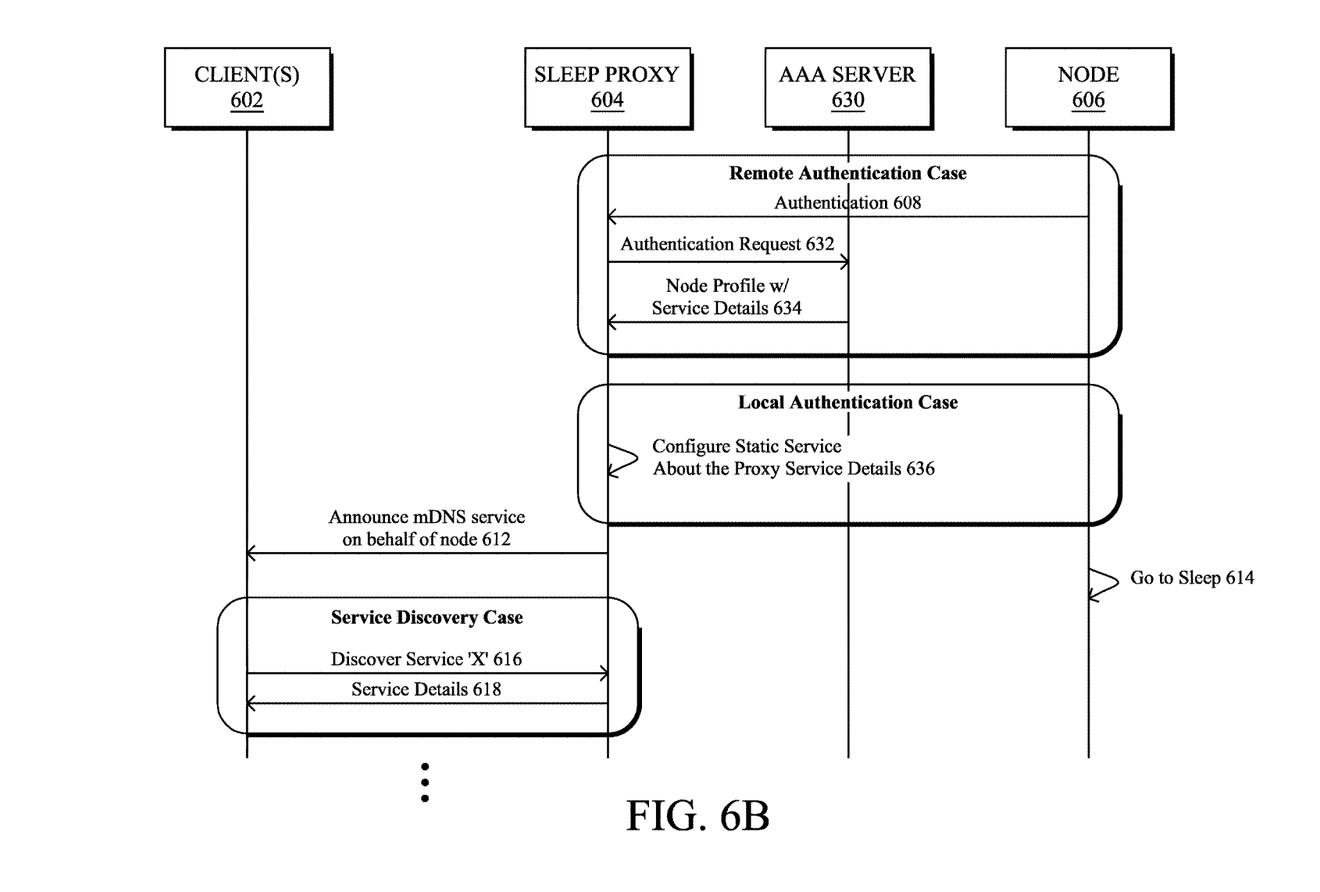

Various variations of the techniques herein are possible, depending on the network infrastructure. In FIG. 6A, an example sequence diagram is illustrated whereby the sleep proxy itself identifies the service(s) of the node based on the traffic, ports, etc., associated with the node. In FIG. 6B, however, another example sequence diagram is illustrated whereby the sleep proxy leverages an authentication, authorization, and accounting (AAA) server in the network, to identify and advertise the service(s) of the client. With specific respect to FIG. 6A, the technique shown may be particularly suited for situations in which the sleep proxy is hosted by a big form factor network element device. Conversely, the technique illustrated in FIG. 6B may be particularly suited for situations in which the sleep proxy is hosted by a small form factor network element device.

As shown in FIG. 6A, assume that the network comprises client(s) 602, a sleep proxy 604, and a node 606 that performs any number of functions/services in the network. In this embodiment, assume that the device acting as sleep proxy 604 also executes a network analytics engine that is configured to analyze the traffic, port information, device details, etc., that are associated with node 606.

Initially, node 606 may send node/device authentication data to sleep proxy 604 (step 608). Such information may, for example, include the basis authorization information needed for node 606 to join the network. In turn, sleep proxy 604 may monitor the data traffic (e.g., protocols used, transport used, types of applications, etc.), ports used, device type, etc., associated with node 606 on the network, to identify the service(s) offered by node 606 (step 610). The gradual learning of the protocol/application information offered by node 606 may then be stored on the network element of sleep proxy 604, along with the client session. This allows proxy service 604 to have all the details regarding node 606, like its IP address, MAC address, sleep period, etc.

In various embodiments, sleep proxy 604 may then announce the identified service(s) of node 606 to the various client(s) 602 in the network (step 612). Notably, sleep proxy 604 may input its learned information regarding node 606 to the service discovery mechanism of the network element. This mechanism can then advertise/announce the services offered by node 606 to the various client(s) 602 in the network (step 614). This eliminates the need for node 606 to have any DNS and/or mDNS presence on the node. The network element acting as sleep proxy 604 may then respond to any mDNS service discovery request by the external applications of client(s) 602.

At some point in time, node 606 may go to sleep by entering its low power mode (step 614). For example, if node 606 is battery-powered, it may turn off certain components or services, so as to conserve battery charge. The network element of sleep proxy 604 may then provide network sleep service for node 606 as a policy, so that the session which has the details about the sleeping node will start acting as a proxy for any service query, ARP query, ping requests, etc., that are destined for node 606 while it is in its low power state.

In some cases, a client 602 may explicitly send a request to sleep proxy 604, to discover a particular service 'X' that may be offered by node 606 (step 616). In turn, sleep proxy 604 may respond with the requested service details to client 602 (step 618).

Once the service of node 606 is known to client 602, it may attempt to use the service of node 606 by attempting to open a TCP connection with node 606 (step 620). However, using an Address Resolution Protocol (ARP) mechanism, such as Gratuitous ARP (GARP), sleep proxy 604 may intercept this attempt (e.g., by having requests destined to node 606 sent to the network element of sleep proxy 604). In turn, sleep proxy 604 may cause node 606 to wake up, such as by sending a WoL "magic" packet to node 606 (step 622). After causing node 606 to awaken, sleep proxy 604 may then send GARP or similar information back to client 602 with the details of node 606, so that client 602 and node 606 can communicate directly with one another (step 624). For example, using this information, client 602 may re-establish a TCP session with node 606, to utilize the service(s) offered by node 606 (step 626).

After client 602 is finished with using the service of node 606 (e.g., node 606 is done reporting a sensor reading, etc.), node 606 may return to sleep. Further registration of node 606 is also not required in the network and the above service advertisement and access may be repeated any number of times.

FIG. 6B illustrates a variation of the sequence diagram of FIG. 6B, which leverages pre-provisioning to detect the service(s) of node 606. As shown, assume that the network also includes an authentication, authorization, and accounting (AAA) server 630. AAA server 630 may be implemented on the same element as sleep proxy 604 or on a different device in the network, in various cases.

Similar to the case of FIG. 6A, node 606 may send a network authentication request to sleep proxy 604 (step 608). However, in FIG. 6B, rather than attempt to identify the service(s) of node 606 from its traffic, etc., sleep proxy 608 may instead leverage AAA server 630 for this information, in various embodiments. For example, sleep proxy 604 may send an authentication request to AAA server 630 that includes the authentication information for node 606 (step 632). In response, AAA server 630 may reply with profile information for node 606 that includes service details for node 606 (step 634). For example, the node profile for a temperature sensor may indicate that the sensor offers a temperature sensing service within the network. In another embodiment, as shown, the network element of sleep proxy 604 may instead locally assess the authentication information from node 606, to determine the service(s) offered by node 606 (step 632).

In either of the two cases above, sleep proxy 604 will now have the service information for node 606, thereby allowing the process to continue as in FIG. 6A. Notably, the process shown in FIG. 6B may continue on through any or all of steps 612-626 described previously with respect to FIG. 6A.

Figure 7:
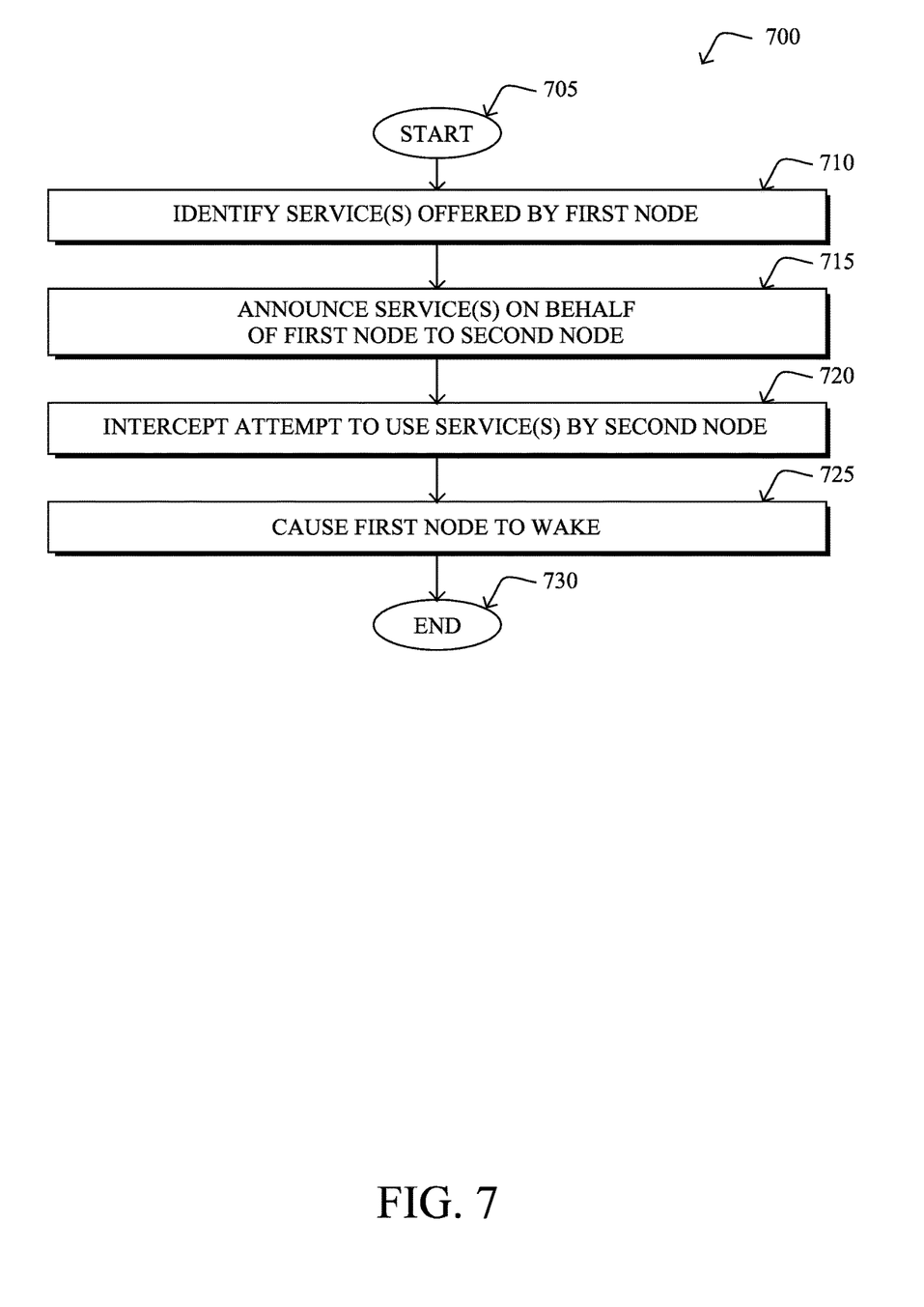
FIG. 7 illustrates an example simplified procedure for using an intelligent sleep proxy in a network.

FIG. 7 illustrates an example simplified procedure for using an intelligent sleep proxy in a network, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the sleep proxy device may identify one or more services offered by a first node in a network. In some embodiments, the device may do so by analyzing traffic data associated with the first node (e.g., port information, application information, etc.). The traffic data may be captured either by the sleep proxy device itself or by one or more other elements in the network (e.g., using exported NetFlow or IPFIX records, etc.). In further embodiments, the device may identify the service(s) of the first node through either local or remote authentication of the node. For example, the sleep proxy device may identify the service(s) of the first node based on a profile for the node received from an AAA server.

At step 715, as detailed above, the sleep proxy device may announce the one or more identified services of the first node to a second node in the network on behalf of the first node. For example, the sleep proxy device may send mDNS, DNS, or similar messages to the second node, to notify the second node of the service(s) of the first node. In various cases, the announcement may be done on a pull or push basis, i.e., with or without first receiving a request from the second node for available services in the network.

At step 720, the device may intercept an attempt by the second node to access the service(s) of the first node, as described in greater detail above. For example, using GARP or other address resolution protocol, the sleep proxy device may ensure that all attempts to reach the first node while the first node is asleep are sent to the sleep proxy device. This ensures that the sleep proxy has enough time to cause the first node to awaken, before the first node receives the attempted access to its service(s).

At step 725, as detailed above, the sleep proxy device may cause the first node to switch from a low power state to an awake state, based on the intercepted attempt. For example, the sleep proxy device may send a WoL magic packet or other instruction to the first node, thereby causing the first node to awaken and provide the service requested by the second node. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, do not impose any requirements on a given node related to the sleeping and waking of the node for purposes of service announcements, such as by having to execute an mDNS or DNS client. Instead, in some aspects, a network element may act on behalf of the node to participate in the service advertisement mechanism. Further, the techniques herein allow for nodes which do not support L3/IP stacks (e.g., L2/MAC based devices), to also have their services advertised via the proxy. During firmware upgrades one can also use the sleep proxy intelligence herein to send the selective cache and upgrade the devices.

While there have been shown and described illustrative embodiments that provide for an intelligent sleep proxy, it is to be understood that various other adaptations and modifications may be made within the spirit and scope of the embodiments herein. For example, while certain protocols are shown, such as mDNS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
identifying, by a sleep proxy device in a network, one or more services offered by a first node in the network by:
receiving, at the sleep proxy device, data regarding traffic associated with the first node, and
using, by the sleep proxy device, the data regarding the traffic associated with the first node to identify the one or more services offered by the first node;
announcing, by the sleep proxy device, the one or more identified services to a second node in the network on behalf of the first node;
intercepting, by the sleep proxy device, an attempt by the second node to use the one or more services offered by the first node; and
causing, by the sleep proxy device, the first node to switch from a low power state to an awake state, based on the intercepted attempt.

2. The method as in claim 1, further comprising:
relaying, by the sleep proxy device, traffic between the first and second nodes, after causing the first node to switch from the low power state to the awake state.

3. The method as in claim 1, wherein identifying the one or more services offered by the first node in the network comprises:
receiving, at the sleep proxy device, a profile for the first node from an authentication, authorization, and accounting (AAA) server that comprises data indicative of the one or more services offered by the first node in the network.

4. The method as in claim 1, wherein identifying the one or more services offered by the first node in the network comprises:
receiving, at the sleep proxy device, authentication data from the first node; and
using, by the sleep proxy device, the authentication data to identify the one or more services offered by the first node.

5. The method as in claim 1, wherein the data regarding the traffic associated with the first node comprises at least one of: port information regarding the first node or a device type associated with the first node.

6. The method as in claim 1, wherein announcing the one or more identified services to the second node in the network on behalf of the first node comprises:
sending, by the sleep proxy device, a multicast Domain Name System (mDNS) message to the second node indicative of the one or more services offered by the first node in the network.

7. The method as in claim 1, wherein announcing the one or more identified services to the second node in the network on behalf of the first node comprises:
receiving, at the sleep proxy device, a service discovery request from the second node; and
sending, by the sleep proxy device, a response to the service discovery request to the second node indicative of the one or more services offered by the first node in the network.

8. The method as in claim 1, wherein the first node does not maintain a Domain Name System (DNS) client, multicast DNS (mDNS) client, or Internet Protocol (IP) stack.

9. An apparatus, comprising:
one or more network interfaces to communicate with a network;
a processor coupled to the network interfaces and configured to execute one or more processes; and
a memory configured to store a process executable by the processor, the process when executed operable to:
identify one or more services offered by a first node in the network; by
receiving data regarding traffic associated with the first node; and
using the data regarding the traffic associated with the first node to identify the one or more services offered by the first node;
announce the one or more identified services to a second node in the network on behalf of the first node;
intercept an attempt by the second node to use the one or more services offered by the first node; and
cause the first node to switch from a low power state to an awake state, based on the intercepted attempt.

10. The apparatus as in claim 9, wherein the process when executed is further operable to:
relay traffic between the first and second nodes, after causing the first node to switch from the low power state to the awake state.

11. The apparatus as in claim 9, wherein the apparatus identifies the one or more services offered by the first node in the network by:
receiving a profile for the first node from an authentication, authorization, and accounting (AAA) server that comprises data indicative of the one or more services offered by the first node in the network.

12. The apparatus as in claim 9, wherein the apparatus identifies the one or more services offered by the first node in the network by:
receiving authentication data from the first node; and
using the authentication data to identify the one or more services offered by the first node.

13. The apparatus as in claim 9, wherein the data regarding the traffic associated with the first node comprises at least one of: port information regarding the first node or a device type associated with the first node.

14. The apparatus as in claim 9, wherein the apparatus announces the one or more identified services to the second node in the network on behalf of the first node by:
sending a multicast Domain Name System (mDNS) message to the second node indicative of the one or more services offered by the first node in the network.

15. The apparatus as in claim 9, wherein the apparatus announces the one or more identified services to the second node in the network on behalf of the first node by:
receiving a service discovery request from the second node; and
sending a response to the service discovery request to the second node indicative of the one or more services offered by the first node in the network.

16. The apparatus as in claim 9, wherein the first node does not maintain a Domain Name System (DNS) client, multicast DNS (mDNS) client, or Internet Protocol (IP) stack.

17. A tangible, non-transitory, computer-readable medium storing program instructions that cause a sleep proxy device in a network to execute a process comprising:
   identifying, by the sleep proxy device, one or more services offered by a first node in the network by:
      receiving, at the sleep proxy device, data regarding traffic associated with the first node, and
      using, by the sleep proxy device, the data regarding the traffic associated with the first node to identify the one or more services offered by the first node;
   announcing, by the sleep proxy device, the one or more identified services to a second node in the network on behalf of the first node;
   intercepting, by the sleep proxy device, an attempt by the second node to use the one or more services offered by the first node; and
   causing, by the sleep proxy device, the first node to switch from a low power state to an awake state, based on the intercepted attempt.

18. The computer-readable medium as in claim 17, wherein the first node does not maintain a Domain Name System (DNS) client, multicast DNS (mDNS) client, or Internet Protocol (IP) stack.

\* \* \* \* \*